Figure 3:
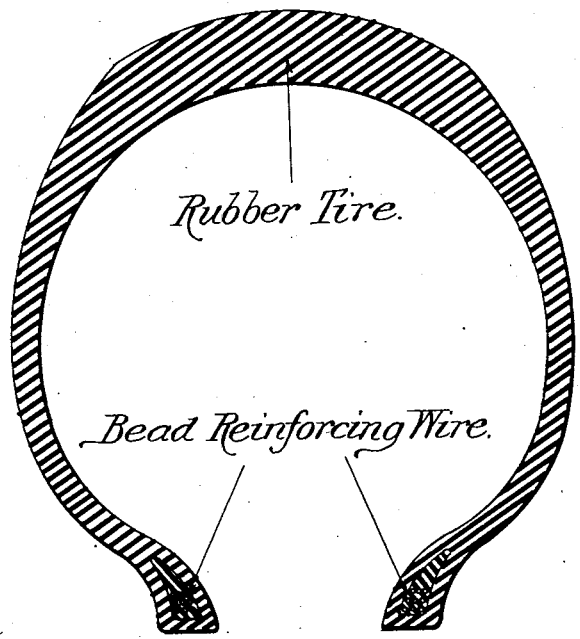

May 21, 1935.   E. C. DOMM   2,002,263
RUBBER COATED STEEL OBJECT
Filed July 30, 1934

Rubber Tire.
Bead Reinforcing Wire.

Wire   Corrosion Resisting Metal.   Copper   Rubber

Rubber   Corrosion Resisting Metal.
Copper   Wire.

Inventor:
Elgin Carleton Domm,
By Dyrenforth, Lee, Chritton & Wiles,
Attys.

Patented May 21, 1935

2,002,263

UNITED STATES PATENT OFFICE 2,002,263

RUBBER COATED STEEL OBJECT

Elgin Carleton Domm, Niles, Mich., assignor to National Standard Company, Niles, Mich., a corporation of Michigan Application July 30, 1934, Serial No. 737,666

11 Claims. (Cl. 91—68)

This invention relates to a rubber coated steel object and particularly to flexible rubber coated steel objects, such as used in pneumatic rubber tires.

It has heretofore been known that steel coated with brass, could be vulcanized directly to rubber. In connection with the flexible articles of small cross-sectional area, it has proved impractical to hot dip the articles in molten brass because of the effect upon the physical characteristics of the article—for example, a wire. Moreover, it has proved difficult to electroplate a brass coating. It was also believed heretofore that pure copper would not bond satisfactorily with rubber.

In the manufacture of rubber tires, the bead of the tire is reinforced by wires. These wires must be firmly attached to the rubber, because if they become loose, they work around and quickly cut through the bead. The outer coating of the bead must therefore be of such a character that it will adhere readily to the rubber. A further difficulty also arises from the fact that moisture may work into the tire and in time corrode the steel wires. When this occurs, the wire no longer adheres to the rubber, and the tire quickly becomes useless.

In order to overcome this difficulty corrosion resistant metals have been tried but do not adhere to the rubber.

It has now been discovered that if a steel article, for example, a steel tire bead reinforcing wire, or a flexible steel strip, is coated with a zinc coating, either electrolytically or by dipping in molten zinc, and is then electroplated with pure copper, it may be very satisfactorily bonded to rubber. It is believed that the reason for this adhesiveness to rubber is due to the fact that the zinc and copper form an alloy after deposition upon the wire. This alloy is indicated by a change in the color of the copper, which, under ordinary circumstances, will fade to a brass colored appearance in a month or so, when in a layer of one one-hundred thousandths of an inch in thickness. It is likewise probable that any alloying is very materially accelerated by the temperature of the vulcanization operation.

The rubber coated wire or strip produced in this manner has good or better physical characteristics than the original object. The temperature of the zinc bath is not high enough to destroy the flexibility of the article, but on the contrary, if properly controlled, may be used to materially increase the elongation limit and elasticity of the article.

A tire bead prepared from a wire made in this manner not only has the property of firm adherence to the rubber, but likewise has high corrosion resistance. The zinc, applied in this manner is integrally united with both the iron and copper, and in fact is apparently alloyed with both. At the same time a gradation occurs from the steel to steel zinc alloy—to relatively pure zinc, to zinc copper alloy and probably to substantially pure copper.

Figure 1:
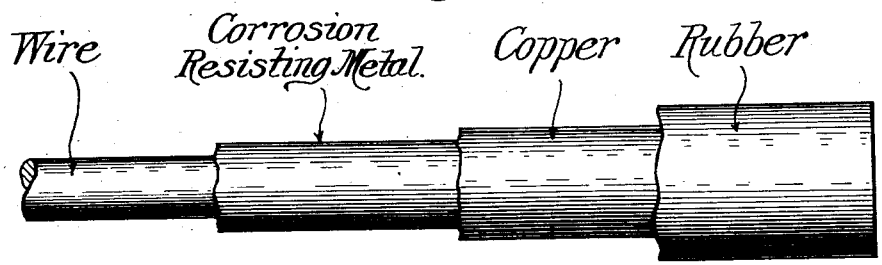
Figure 2:
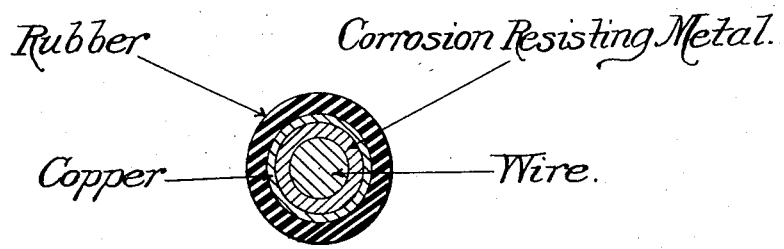

The invention is illustrated diagrammatically in the drawing, wherein Fig. 1 shows a broken view of a wire cut away to show the various coatings, and Fig. 2 is an end view of the same, and Fig. 3 shows a cross section through a tire, showing the bead wires in place. It is to be understood that the distinct layers of corrosion resisting metal and copper are shown for the purpose of illustration only. The drawing is necessarily very much out of scale.

In carrying out the process, great care should be exercised at all times to have the steel article clean. Likewise the electroplating of copper upon the zinc should be carefully controlled in order to avoid difficulties such as blistering.

An example of the process of the invention will be given in connection with steel tire bead reinforcing wires having a diameter of .037 to .043 inches. These wires have a typical composition as follows:

|  | Percent |
|---|---|
| Carbon | .65 |
| Manganese | .80 |
| Phosphorous | .015 |
| Sulphur | .025 |
| Silicon | .095 |

Balance is iron with traces of impurities.

The wires may be fed continuously from swifts, or the like, through the entire system. They are first cleansed by scraping and then wiping with rags soaked in a grease solvent, such as gasoline. They are then further cleansed by passing through a bath of hydrochloric acid, preferably containing about 10% HCl. The excess acid is removed by wet rags, and the wires then passed through a water bath. They are again passed through acid, this time about 8% HCl and are again wiped and washed. The number and extent of these cleansing treatments depends, of course, upon the original condition of the wire.

The wires, when thoroughly clean, are drawn through a flux, such as a saturated solution of zinc ammonium chloride, the excess solution is removed by a rag wipe, and the wires then drawn through a bath of molten zinc.

The temperature of the zinc bath is particularly important in connection with the tire bead reinforcing wires. The bath must not be so hot as to injure the physical characteristic of the wire. It has been found that by proper adjustment of the temperature of the bath the wire may actually be improved. For example, it is desirable that tire bead wires should have a rather high limit of elongation and elasticity. As produced, such wire ordinarily has an elongation limit of ¼ to 1½%. By maintaining the zinc bath at proper temperatures, this may be considerably increased. For example, with wires of .037 to .043 inches in diameter, an immersion of 1 to 5 seconds in a zinc bath held at 820 to 840 degrees F. may cause an increase in elongation limit from ¼ to 1½% in the original wire to 2¾ to 5% after treatment. At the same time the elastic limit of the wire may be increased from 65 to 85%. For example, the wire may be passed through a 3 to 15 foot bath of zinc at 180 feet per minute, the zinc being maintained at 840 degrees F.

The steel article acquires a coating approximately 1/4000ths to 1/11,000ths of an inch in thickness. For example, with wire of .043 inches diameter, weighing 4.88 lbs. per 1000 feet of wire, the weight of the zinc is about 8 to 20 grams per kilogram of wire. With .037 inches diameter wire, weighing 3.61 lbs. per 1000 feet, the weight of the zinc is about 10 to 24 grams per kilogram.

The zinc alloys itself with the iron to some extent, so that about 10 to 25% of the zinc coating is iron. This results in a better bonding than where the zinc is applied electrolytically.

After leaving the zinc bath, the excess zinc is removed by an asbestos wiper, and the wire is then drawn while still quite warm (within one or two seconds after leaving the zinc bath) through a bath of dilute caustic soda, containing about 5% sodium hydroxide. The caustic generates a quantity of hydrogen by action upon the zinc, and it is believed that this action has a favorable effect upon the copper plating, possibly because of adsorption of the nascent hydrogen.

The wires are then washed in warm water and passed into a copper plating bath. The plating is preferably carried out by the cyanide process, using a solution containing 4½ oz. of sodium cyanide, 3 oz. of copper cyanide, 2 oz. of sodium carbonate and ¼ oz. sodium hyposulphite per gallon. Generally several consecutive plating baths are used. At each end of the plating tanks the wire is fed over copper rolls to which a low voltage direct plating current is supplied in sufficient amperage and voltage to plate the wire. A normal current density is 30 amperes per square foot.

The electrolyte is continuously circulated, and a portion thereof is continuously removed from the tank, warmed to about 120 degrees F. and replaced. This flow of electrolyte is particularly advantageous in removing gas bubbles.

Copper is applied at the rate of 0.5 to 1.3 grams per kilogram of wire. The proportion of zinc to copper is therefore from 6 to 30 parts of zinc to one part of copper.

The weight of 0.5 grams of copper per kilogram of .043 inch diameter tire bead wire is equivalent to an average thickness of about 1/240,000 inch. The corrosion resistant metal will normally have a thickness of the order of 1/4000 to 1/11,000 inch. It is preferred that the copper layer not exceed 1/60,000 inch in thickness. The thickness of 1/240,000 inch is equivalent to about 0.1 grams per square foot of surface and the thickness of 1/60,000 inch to about 0.4 grams per square foot of surface. These figures are derivable by simple arithmetic with knowledge of the specific gravities of copper and steel.

After leaving the plating bath the wires are washed with water, first cold and then hot, and are then air dried.

After the steel articles have been zinc and copper plated, they may be coated with rubber and the rubber vulcanized directly thereto in accordance with known practice.

Other rubber adhesion increasing coating such as antimony may, of course, be added if desired. Likewise, other substances may be added to the zinc to accomplish particular qualities in the finished product.

The coating of zinc lessens or prevents corrosion of the material to which it is applied; and the copper alone, or alloyed with the zinc, increases the bonding or adhesion to rubber when the article is employed in rubber.

In place of the zinc other corrosion-resisting metals may be used, and particularly those which will alloy with copper or will produce with the copper a rubber adherent coating. Such metals include, (besides zinc) cadmium, tin, and lead, and alloys thereof. In general it is preferred to apply such corrosion-resisting metals in substantially pure state, that is, at least 90% of the added metal of the initial layer will normally consist of one or more of the corrosion-resisting metals, but it is frequently possible to use alloys containing less than this proportion of the corrosion-resisting metal. The metals alloyed with the corrosion-resisting metals in the initial coat may be any metal desired for that purpose and which does not interfere with the subsequent operations. Small percentages of aluminum, magnesium, antimony, copper or arsenic are frequently used in the lower coat.

The use of zinc or cadmium is much preferred to lead or tin. Zinc and cadmium provide an electro-positive coating which acts electrolytically and protects even though the coating is not complete. Tin and lead provide mechanical protection which is excellent if complete, but under present methods of application this is not accomplished. While cadmium is chemically preferred to zinc, it is much more expensive, so that economically zinc is preferable. Tin is considerably more effective than lead.

The base upon which the initial coat is deposited is preferably a ferrous base material, but any other platable surface may be used. Preferably the surface is metallic, but non-metallic surfaces may be plated with a metal, as by dipping or spraying, and then plated with the corrosion-resisting layer, or the latter may be applied directly to the object. For example, wood and ceramic materials may be so treated.

This application is a continuation in part of my co-pending applications Serial Numbers 665,425, filed April 10, 1933, and 720,890, filed April 16, 1934.

The foregoing detailed description has been given for clearness of understanding only, and no unnecessary limitations should be understood therefrom, but the appended claims should be construed as broadly as permissible, in view of the prior art.

What I regard as new, and desire to secure by Letters Patent is:

1. In the production of rubber coated ferrous base articles, the step of producing a rubber adherent coating by separately coating said article with a thin layer of corrosion resistant metal of the class consisting of zinc, cadmium, lead, tin, and a layer of copper having a thickness less than approximately 1/60,000 inch, and of a thickness to alloy throughout with the corrosion resistant metal at atmospheric temperature or the temperature of vulcanization and produce a thin layer of rubber adherent alloy on the surface thereof, and vulcanizing a coating of rubber thereto.

2. The method as set forth in claim 1 in which the corrosion resistant metal has a thickness of the order of 1/4,000 to 1/11,000 inch.

3. The method as set forth in claim 1 in which the copper has a thickness of the order of 1/60,000 to 1/240,000 inch and the corrosion resistant metal of the order of 1/4,000 to 1/11,000 inch.

4. The method as set forth in claim 1 in which the alloying is completed during vulcanization.

5. A rubber coated article comprising a ferrous metal base, a coating of corrosion resistant metal of the class consisting of zinc, cadmium, tin and lead, over said base, a thin copper coating thereon having a thickness less than approximately 1/60,000 inch and of a thickness to alloy throughout with the corrosion resisting metal at atmospheric temperature or the temperature of vulcanization and produce a thin coating of rubber adherent alloy thereon, and a coating of rubber vulcanized thereon.

6. An article as set forth in claim 5 in which the corrosion resistant metal layer has a thickness of the order of 1/4,000 to 1/11,000 inch.

7. An article as set forth in claim 5 in which the copper has a thickness of the order of 1/60,000 to 1/240,000 inch and the corrosion resistant metal a thickness of the order of 1/4,000 to 1/11,000 inch.

8. An article as set forth in claim 5 in which the copper has a thickness of the order of 1/100,000 inch.

9. A ferrous base article adapted for adherent vulcanization to rubber having a thin layer of corrosion resistant metal of the class consisting of zinc, cadmium, lead and tin, the thickness of the metal being of the order of 1/4,000 to 1/11,000 inch, and a thin copper layer on the corrosion resistant metal, said layer having a thickness less than approximately 1/60,000 inch and of a thickness to alloy throughout with the corrosion resistant metal at atmospheric temperature or the temperature of vulcanization and produce a thin layer of rubber adherent alloy thereon, whereby during vulcanization to the article of a rubber layer, the latter is bonded to the corrosion resisting metal by the alloy layer.

10. An article as described in claim 9 in which the copper has a minimum thickness of the order of 1/240,000 inch.

11. An article as set forth in claim 9 in which the article is a tire bead wire, and the several metallic layers surround all the wire surface.

ELGIN CARLETON DOMM.